Figure 1:
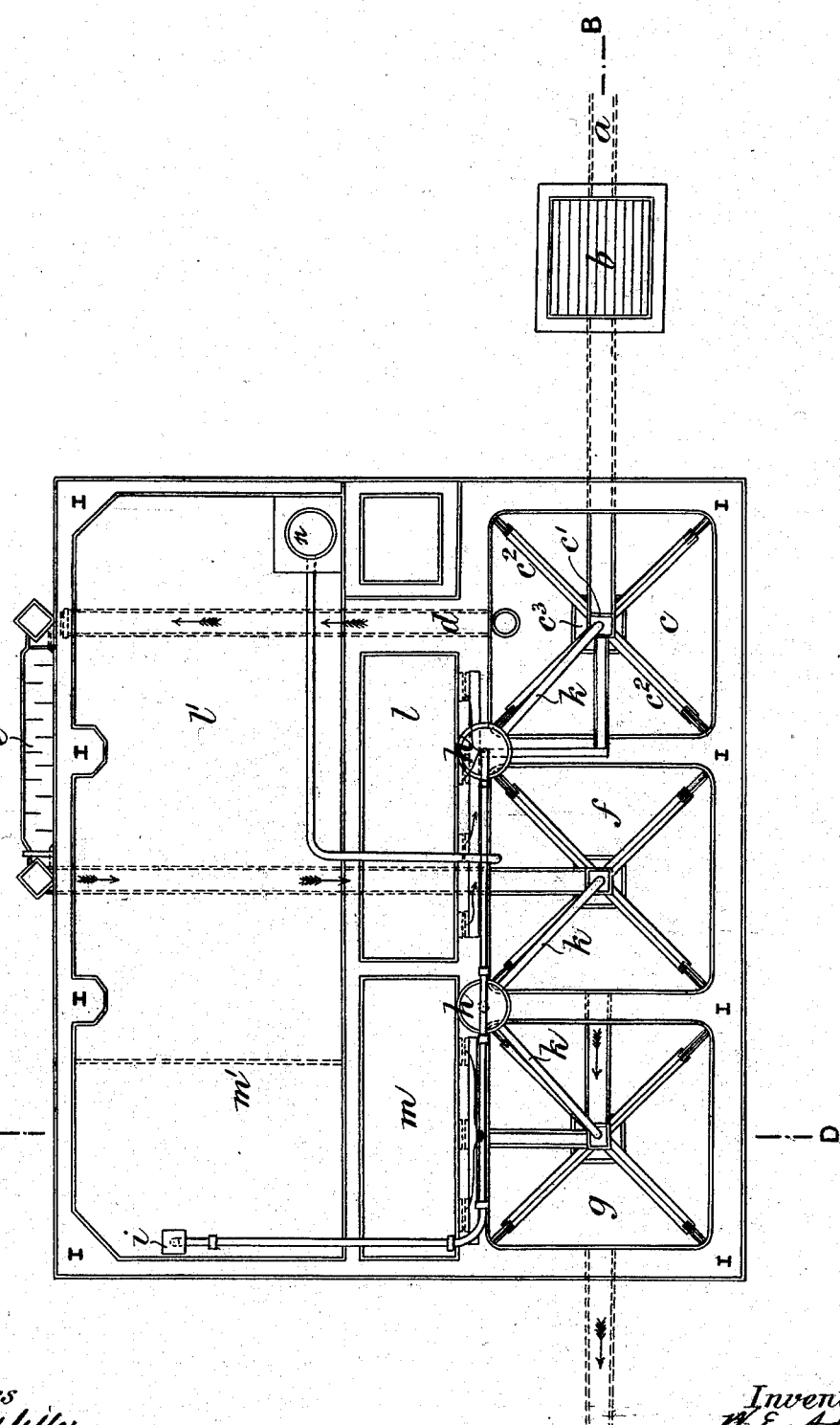

(No Model.) 3 Sheets—Sheet 1.

W. E. ADENEY & W. K. PARRY.
PROCESS OF PURIFYING SEWAGE.

No. 505,182. Patented Sept. 19, 1893.

(No Model.) 3 Sheets—Sheet 3.

W. E. ADENEY & W. K. PARRY.
PROCESS OF PURIFYING SEWAGE.

No. 505,182. Patented Sept. 19, 1893.

Witnesses
B. H. Miller
C. F. Sensner

Inventors
W. E. Adeney
W. K. Parry
By their Attorneys
Baldwin, Davidson & Wight

United States Patent Office.

WALTER ERNEST ADENEY, OF MONKSTOWN, AND WILLIAM KAYE PARRY, OF DUBLIN, IRELAND.

PROCESS OF PURIFYING SEWAGE.

SPECIFICATION forming part of Letters Patent No. 505,182, dated September 19, 1893.

Application filed October 28, 1892. Serial No. 450,272. (No specimens.) Patented in England March 1, 1890, No. 3,312; November 22, 1890, No. 18,983, and June 26, 1891, No. 10,929.

*To all whom it may concern:*

Be it known that we, WALTER ERNEST ADENEY, curator, Royal University, Dublin, residing at 1 Eaton Place, Monkstown, county of Dublin, and WILLIAM KAYE PARRY, civil engineer and architect, residing at 35 Dame Street, Dublin, Ireland, subjects of the Queen of Great Britain, have invented certain new and useful Improvements in the Purification of Sewage, (for which we have received Letters Patent in Great Britain, No. 3,312, dated March 1, 1890, and for which I, WALTER ERNEST ADENEY, have also received Letters Patent in Great Britain, No. 18,983, dated November 22, 1890, and No. 10,929, dated June 26, 1891,) of which the following is a specification.

Our invention has for its object improvements in the purification of sewage.

We have found that liquid sewage is rapidly freed from organic matter by micro-organisms, when the conditions are suitable for the multiplication of organisms of a suitable nature, that is to say when oxygen is supplied sufficiently freely and when the temperature is suitably regulated. We have also found that solid matter separated from sewage may be dried without putrefaction setting in when the conditions are such that oxygen is available for the sustenance of suitable micro-organisms wherever throughout the mass micro-organisms are able to penetrate. Founded on these discoveries our method of treatment is as follows:—We strain the sewage through a sieve or grating and then run it into a very deep tank. We lead the sewage to the bottom of this tank by a trunk and there cause it to be delivered in a horizontal direction. The liquid matter flows out from the top of the tank taking but a comparatively small amount of solid matter with it. In some cases it is necessary to neutralize the sewage. If so the operation is performed in this tank by the addition of the requisite quantity of chalk or limestone or dilute mineral acid. The solid matter from the sewage collects in a sump in the bottom of the tank immediately beneath the lower end of the descending trunk. A pipe passes down through the trunk into the sump and through this pipe the solid matter is sucked up and removed from time to time. Its further treatment we will presently describe. To the liquid overflowing from the tank manganate of soda is added in the proportion of two to five grains to the gallon, and the liquid is heated by means of steam or otherwise to a temperature preferably between 80° and 90° Fahrenheit. The treated sewage is passed into a second tank in all respects similar to the first. In this tank, a separation of brown hydrated peroxide of manganese, $MnO_2,H_2O$, takes place. Part of the manganese falls to the bottom and part of it floats on the surface. It is sucked up out of the tank from time to time and skimmed off the surface and is utilized as hereinafter described. The liquid from the second tank overflows into a third tank, again in all respects similar to the first, and as it passes from tank to tank or after it has entered the third tank from two to three grains to the gallon of niter are added to insure the maintenance of oxygen supply to the micro-organisms the germs of which naturally exist in fresh sewage, air and ordinary water. From this tank a clear and purified effluent is delivered. A certain amount of hydrated peroxide of manganese is deposited in the third tank which is recovered from time to time and utilized like the rest. The solid matter from the sewage raised from the first tank is strained through suitable canvas strainers or pressed through filter presses, and so is separated from the liquid which is returned to the first tank. The solid matter removed from the strainers or press can be dried in favorable weather in the open air since it is unmixed with precipitating chemicals; in unfavorable weather it is spread in a thin layer upon a drying floor and then over it there is spread a layer of hydrated peroxide of manganese removed from the tanks and so several alternate layers of solid matter from the sewage and hydrated peroxide of manganese may be accumulated one over the other until the bed upon the drying floor attains the thickness desired; this will be dependent on the amount of drying space available but should not be more than three inches. The hydrated peroxide of manganese should be used in the proportion of about eight parts to one hundred parts of solid sewage matter both being reckoned in the dry state. The material on the drying floor should be frequently turned over. It will be found that the hydrated peroxide where buried will be slowly deoxidized and afterward when brought to the surface will again absorb oxygen from the air. The remainder of the hydrated peroxide of manganese from the tanks may be reconverted into manganate of soda to be again used.

In order that the invention may be more clearly understood, reference is made to the accompanying drawings, in which—

Figure 2:
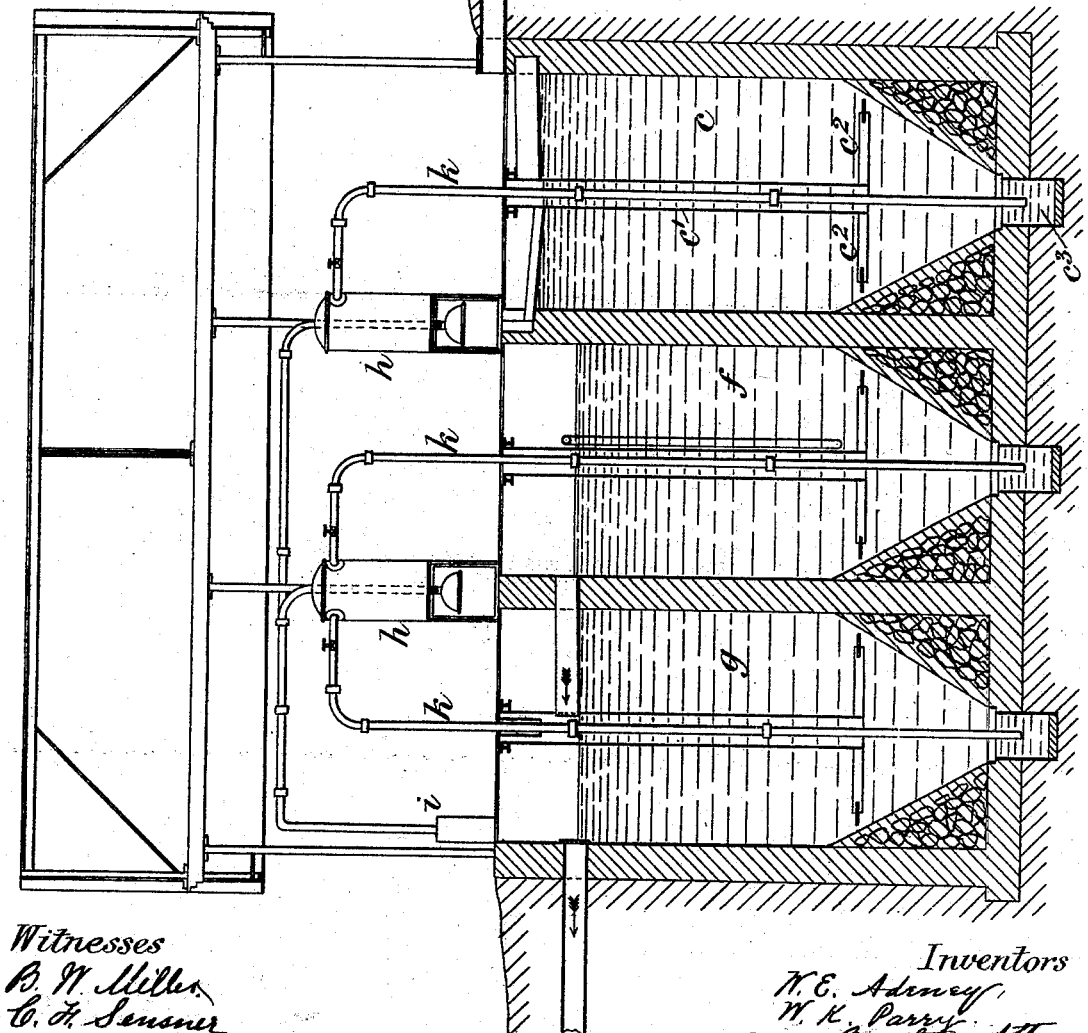
Figure 3:
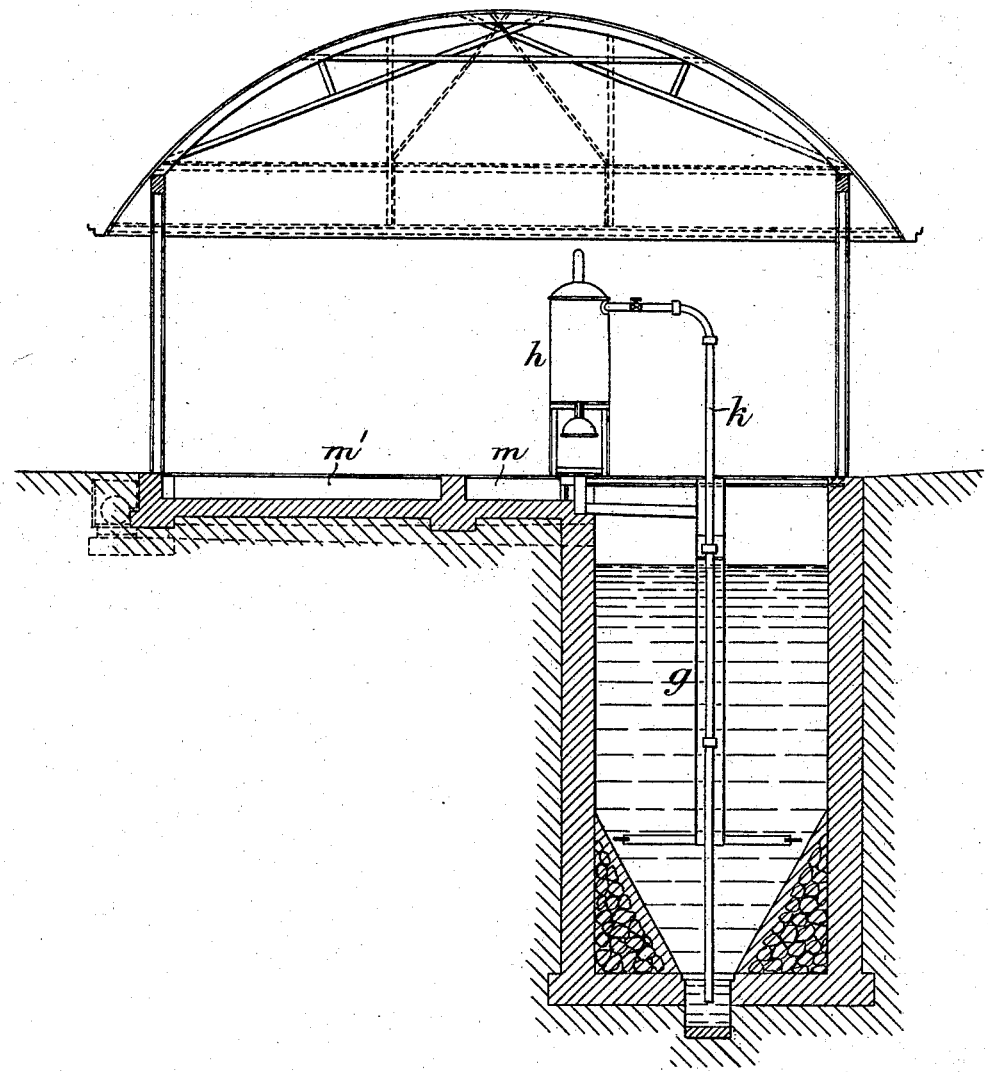

Figure 1 is a plan view of the apparatus we employ, with the roof removed. Fig. 2 is a section on the line A—B of Fig. 1, and Fig. 3 is a section on the line C—D, of Fig. 1.

$a$ is the pipe which brings in the sewage.

$b$, is a strainer through which the sewage passes.

$c$ is the deep tank into which the sewage is received.

$c'$ is a trunk, through which the sewage passes into the tank $c$. The trunk $c'$ passes down nearly to the bottom of the tank $c$, and is provided with radial arms $c^2 c^2$, which serve to insure a lateral diffusion of the sewage when it reaches the bottom of the trunk. This they do by checking local upflows in the angles of the tank, which, if the arms $c^2$ were removed would be liable to occur.

$c^3$ is the receptacle for the sludge at the bottom of the tank.

$d$ is the overflow from the tank, and $e$ is a mixing race along which the liquid flows, and where the solution of manganate of soda is run in.

$f$ is the second tank similar to the first, and $g$ is the third tank into which it overflows from the second, and in which the addition of niter is made.

$h\ h$ are cylindrical vessels which can be exhausted by an air pump $i$.

$k\ k$ are pipes passing from the vessel $h$ to the bottom of the tanks $c, f$ and $g$, and through which, on opening cocks, the sludge can be sucked up into the vessels. From the vessel $h$, the sludge is delivered into sacks applied beneath a mouth or opening at the bottom of the vessel. The sludge can afterward be spread to dry on the floors $l\ l'$, and $m\ m'$. The floors $l\ l'$ are for the raw sewage sludge, and the floors $m\ m'$ for the manganese sludge.

$n$ is a boiler generating steam, which can as required be blown into the tank $f$.

What we claim is—

1. The herein described process for the purification of liquid sewage, which consists in separating the solid matter, suitably regulating the temperature of the sewage and adding manganate of soda and subsequently adding another inorganic oxidizing agent, such as nitrate of soda.

2. The herein described process, which consists in separating solid matter from sewage, suitably regulating the temperature of the sewage while under treatment, adding manganate of soda, and then recovering manganese added as manganate of soda, in the form of the insoluble hydrated peroxide of manganese, and then re-converting the same into manganate of soda for reuse for sewage purification.

WALTER ERNEST ADENEY.
WILLIAM KAYE PARRY.

Witnesses:
EDWD. BENTLEY,
5 Foster Place, Dublin, Solicitor's Asst.
ROBT. H. BEAUCHAMP,
Notary Public, Dublin.